(No Model.)
H. P. OSTRUM.
NAIL FEEDER FOR NAILING MACHINES.
No. 298,882. Patented May 20, 1884.
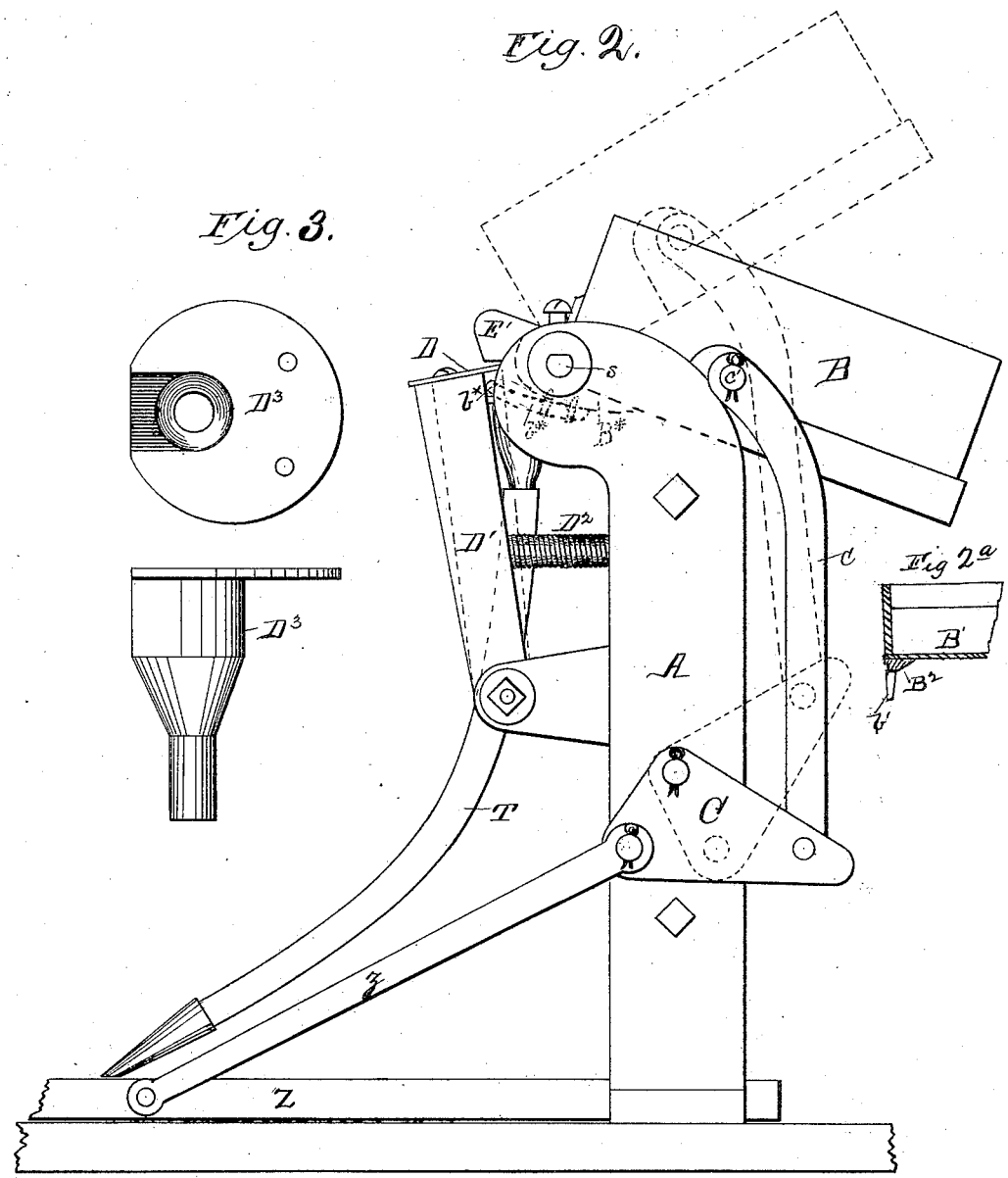

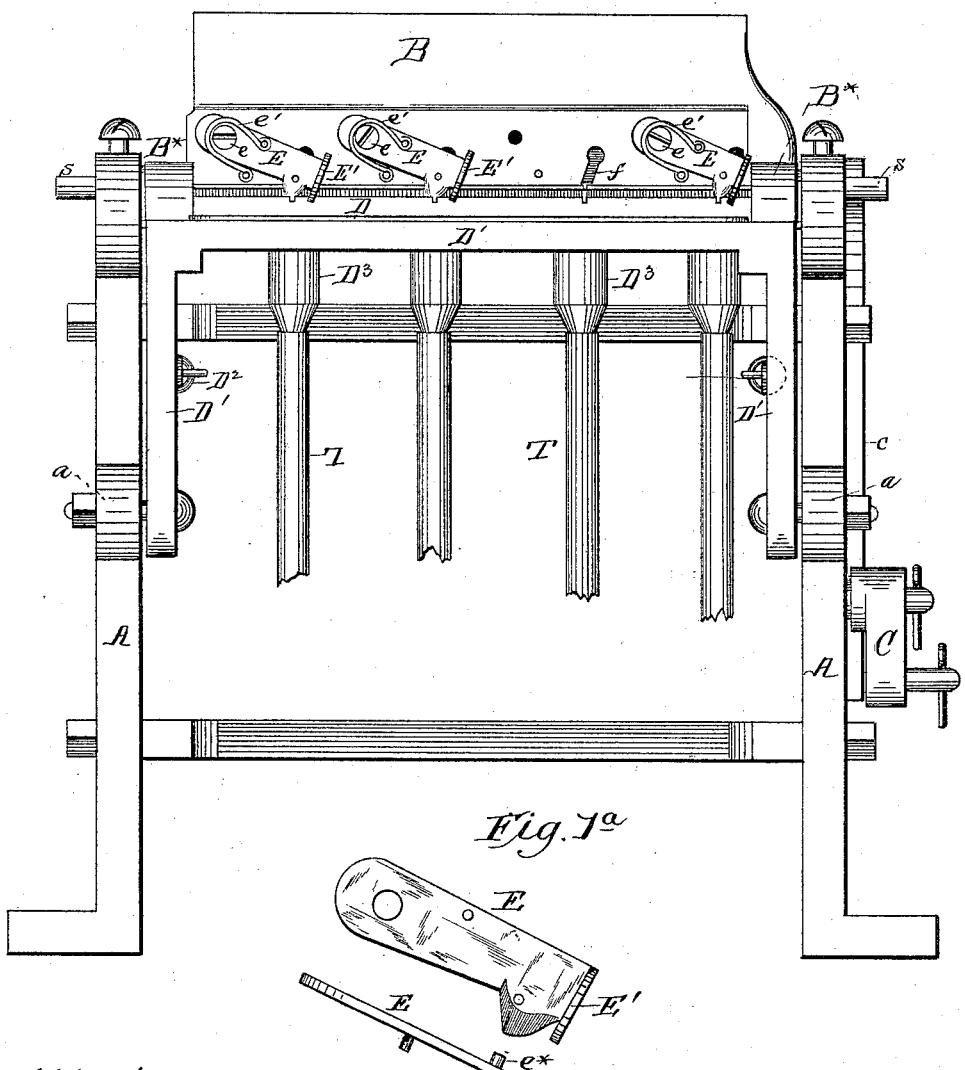

(No Model.) 3 Sheets—Sheet 3.

H. P. OSTRUM.
NAIL FEEDER FOR NAILING MACHINES.

No. 298,882. Patented May 20, 1884.

Attest
W. W. Hollingsworth
C. E. Allen

Inventor.
Henry P. Ostrum
by J. N. Kalb, Atty.

UNITED STATES PATENT OFFICE.

HENRY P. OSTRUM, OF NEW HAVEN, CONNECTICUT.

NAIL-FEEDER FOR NAILING-MACHINES.

SPECIFICATION forming part of Letters Patent No. 298,882, dated May 20, 1884.

Application filed August 10, 1883. (No model.)

*To all whom it may concern:*

Be it known that I, HENRY P. OSTRUM, a citizen of the United States of America, residing at New Haven, in the county of New Haven and State of Connecticut, have invented certain new and useful Improvements in Nail-Feeders for Nailing-Machines, of which the following is a specification, reference being had therein to the accompanying drawings.

My invention relates to nail-feeders for box-nailing machines. I provide a tilting hopper with the slits for conveying the nails cut obliquely to the walls thereof, and pivoted gates for cutting off the nails at the mouths of the hopper operated by the tilting of the hopper.

The invention will be fully understood as hereinafter described, and set forth in the claims.

The accompanying drawings illustrate what I consider the best means for carrying the invention into practice.

Figure 4:
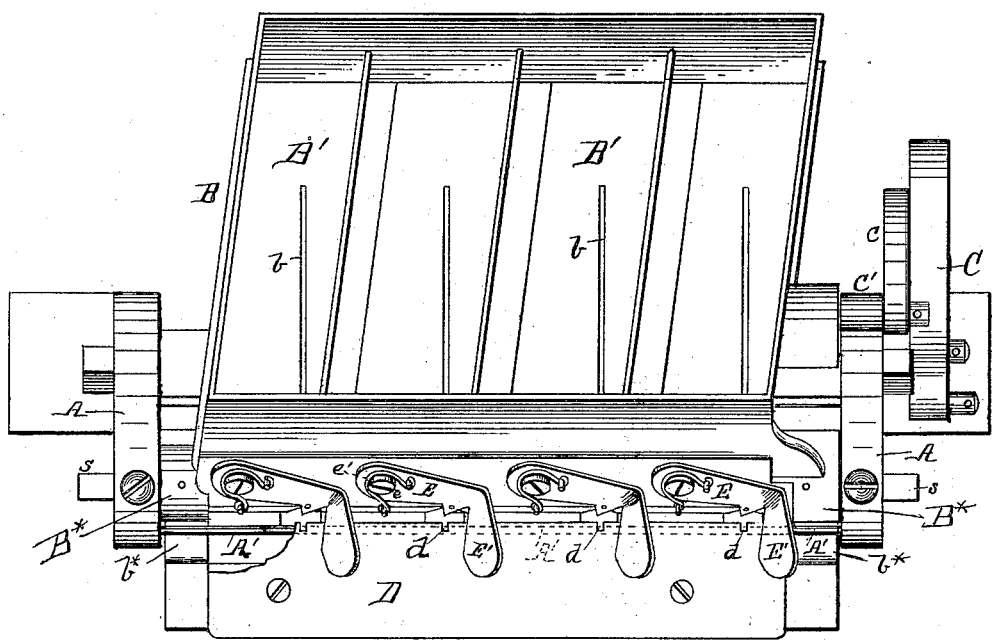
Figure 5:
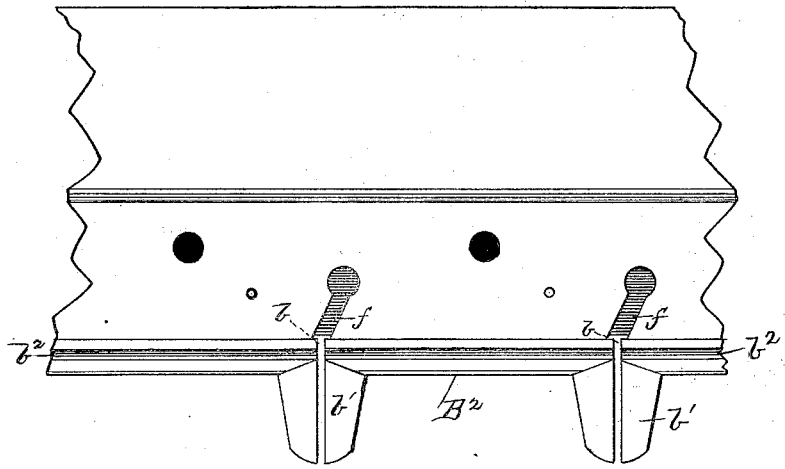

Figure 1 is a front elevation of the device. Fig. 1$^a$ is an enlarged detail, showing the gate in two positions. Fig. 2 is a side elevation, showing the connection to a nailing-machine. Fig. 2$^a$ is a detail showing the enlarged or thickened portion on the lower front edge of the hopper. Fig. 3 is an enlarged detail, Fig. 4 is a plan view, and Fig. 5 an enlarged front elevation, of a portion of the hopper-front.

Similar letters of reference indicate corresponding parts in all the figures.

I have not deemed it necessary to show the machinery of the nailing-machine in detail, simply outlining the sliding portion which operates the feeder, and is marked Z in Fig. 2, while the connecting-rod, which works the feeder, is marked $z$.

A indicates the standards which support the working parts. They are connected by cross-bars, as shown, and are to be secured to a stationary part. The hopper B, divided into any desired number of compartments, is pivoted to the standards A, and is tilted by the movement of the bed Z of the nailing-machine, as before said. The connection $z$ from said bed or slide is secured to a pin on the crank-lever C, which is pivoted to a post on one of the standards. The other limb of the lever C is connected to the hopper by a rod, $c$, and when the slide or bed of the nailing-machine is moved back and forth the hopper will be tilted. The shouldered stud $c'$ on the side of the hopper to which the connecting-rod $c$ is attached, rests against the standard as a stop when the hopper is tilted back. The hopper is rhomboidal in form, with one face set parallel to the receiving-plate D. The divisions forming the compartments of the hopper are parallel to the walls thereof, and the compartments are consequently oblique. The bottom, B', is provided with slits $b$, cut at right angles to the face of the rhomboid which is parallel with the receiving-plate, so that the slits will be oblique to the walls of the hopper and will therefore receive nails more readily, as they are caused to cross them in traveling to the mouths of the hopper. The slits being parallel with the line through which the hopper moves in being tilted will feed the nails down freely. The thickened portion B$^2$ of the bottom B' is provided with teats $b'$, through which the slits $b$ are continued. The front of the rim B$^2$ is grooved, as shown at $b^2$, into which channel $b^2$ the edge of the receiving-plate D projects when the hopper is tilted forward. The receiving-plate is provided with notches or short slits $d$, which register with the slits $b$ in the hopper, and receive the nails when they drop or slide out of the slits $b$. The plate D is carried on a swinging support, D', set upon brackets $a$ $a$ on the standards A. Springs D$^2$ tend to keep the plate D drawn to the hopper with its edge in the channel $b^2$ to receive the nails; but when the hopper is tilted back projecting tongues $b^*$, secured to a part thereof, bear against the frame D' and throw it out away from the hopper. The tongues $b^*$ are pieces of metal secured to the socket-ears B$^*$ or formed integral therewith. They are shown screwed on in dotted lines, Fig. 2. As the plate D with its supporting-frame is forced away from the hopper by the backward tilt of the latter, it rides over a throw-off bar, A', fixed to the standards A, and the nails which the plate has received from the hopper and now carries, coming into contact with the bar are removed from the plate and dropped down into the shoes D³, that are secured to the under side of the plate D, and then down through suitable tubes and delivered to the nailing-machine. The shoes D³ are cut away at the top on the side next to the hopper, and the teats b' fit into these openings, so that the body of the nail is guided directly into the shoe when it is delivered to the receiving-plate.

It will be seen from the parts already described, that by tilting the hopper forward the nails will flow down the slits b, and one will be delivered upon the receiving-plate from each slit. If the hopper be tilted back the receiving-plate will be forced away from the hopper, and riding over the throw-off bar will have the nails it bears thrown off into the tubes.

To prevent the nails from leaving the mouths of the hopper after one has been delivered to each notch in the plate D until said plate is ready to receive another set of nails, I provide a series of gates, E, on the front face of the hopper, which move down and close the mouths through which the nails pass from the compartments as soon as the hopper begins to move on its backward tilt. The gates are pivoted on screws e, and are fitted with springs e', which tend to keep the gates shut over the mouths of the hopper-compartments. The gates are provided with forwardly-extending projections or wings E', which come into contact with the plate D and lift the gates when the hopper is tilted forward. When the gates are lifted a nail can pass out of each compartment, and as the lifting of the gates occurs at the time when the receiving-plate is brought up against the front of the hopper the nails will be received thereon. When the plate D has thus received the nails and the hopper is again tilted back, the gates fall down over the mouths of the hopper-compartments as the pressure and contact between the wings E' and the plate D is relieved. The nails will be held in the hopper until it is again tilted up and the plate brought into position for receiving the next set of nails.

To keep a nail or two in proper position to drop out of the hopper-compartments when the hopper is tilted up, each gate is provided with a pin, $e^*$, which extends into a groove, f, in the front face of the hopper and bears upon the head of a nail or two which lie first in the slit b at the mouth of the compartment when the hopper is tilted back and the gate covers the mouth. When the gate is raised at the approach of the plate D toward the uplifted hopper, the pin $e^*$ is raised from the nail-head and the nail is allowed to drop out. The springs e', which urge the gates downward, also give force to the pins $e^*$, and enables them to hold the nails.

In the construction shown socket-ears B* are provided on the hopper-frame, into which pivot-pins s, removably secured in the standards A, are set, upon which pins the hopper tilts. The springs D² are attached at one end to the swinging frame D' and at the other to the standards A. The flexible tubes T are connected to the lower ends of the shoes D³ and lead down to the nailing-machine, as shown in my patent referred to. The tilting of the hopper jostles the contained nails about and starts them down the slits b, hanging by their heads with their bodies projecting through the bottom of the hopper.

Having thus described my invention, what I desire to claim and secure by Letters Patent is—

1. In a machine for feeding nails, a hopper having slits for feeding the nails cut at an oblique angle to the walls of the hopper, as set forth.

2. In a nail-feeder, the combination, with the tilting nail-feeding hopper, of a receiving-plate, and means, substantially as described, for bringing the hopper and plate together when the hopper is tilted forward and separating them when the hopper is tilted back, and a throw-off rod for removing the nails from the receiving-plate when the hopper is tilted back, as set forth.

3. In a nail-feeder, the gate E, pivoted to the tilting hopper and operated thereby, and provided with the wing E', adapted to bear upon the receiving-plate, substantially as set forth.

4. In a nail-feeder, the combination of the tilting hopper having slits in its bottom for guiding the nails, and provided with projecting tongue or tongues $b^*$, with a receiving-plate and a swinging support therefor, and spring or springs D², substantially as set forth, whereby the plate is drawn toward the hopper when the latter is tilted up and forced away from it when the hopper is tilted back.

5. In a nail-feeder, the combination, with the tilting feeding-hopper D, provided with slits b, and the receiving-plate D, and means for operating them, of the gates E, provided with the wings E', by means of which the gates are raised when the hopper is tilted up, and pins $e^*$, which bear upon a nail or two in the mouth of each slit b when the hopper is tilted back and holds them in readiness for delivery.

6. The combination of the feeding-hopper B, having the teats b', and the slits b, cut into the bottom of the hopper and through the teats b', with the receiving-plate D, provided with the shoes D³, cut away on one side, into which open side of the shoes the teats b' project, whereby the nails are guided directly into the shoes, substantially as set forth.

In testimony whereof I affix my signature in presence of two witnesses.

HENRY P. OSTRUM.

Witnesses:
 GEORGE TERRY,
 FRANK P. SMITH.